UNITED STATES PATENT OFFICE.

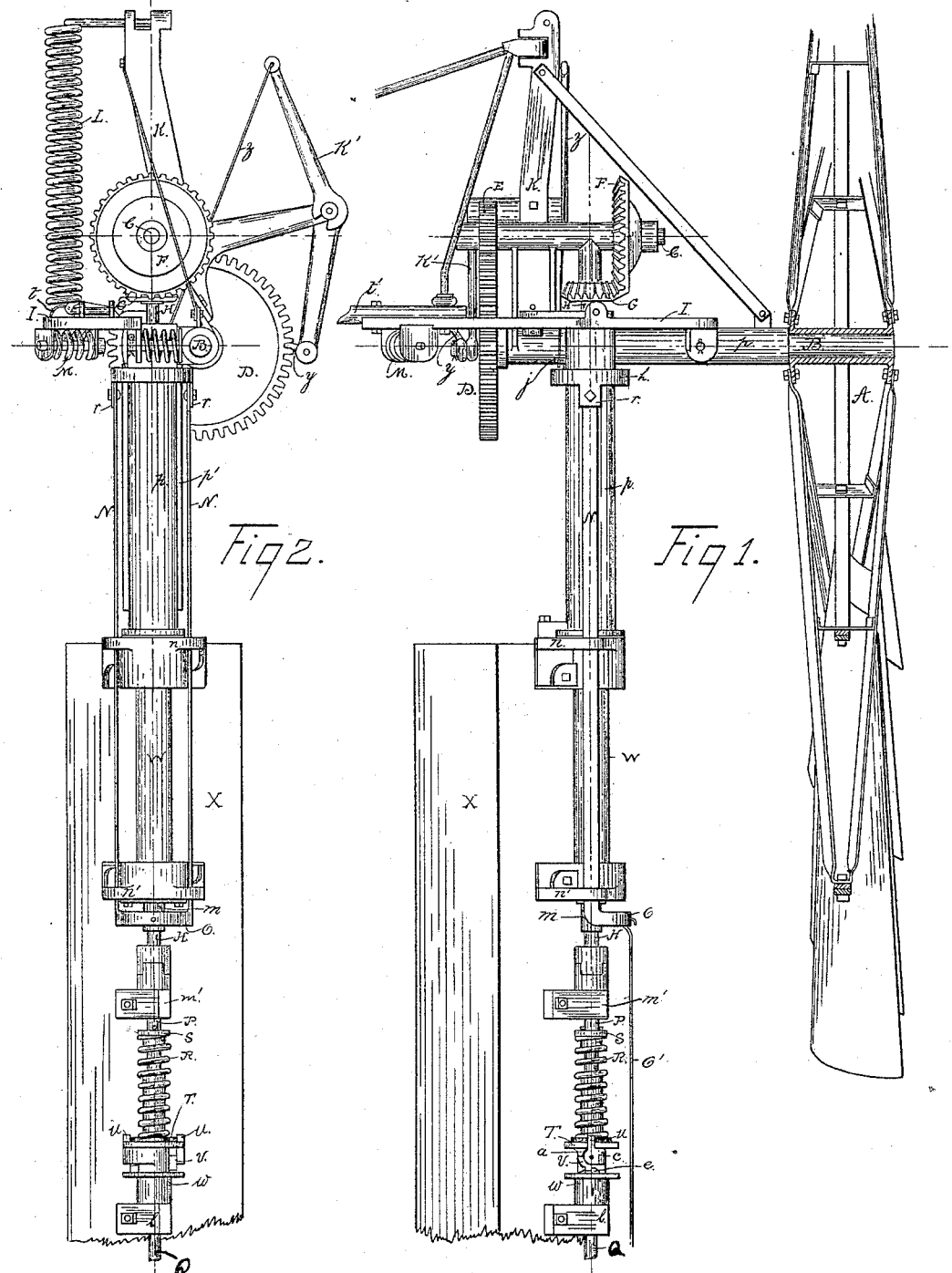

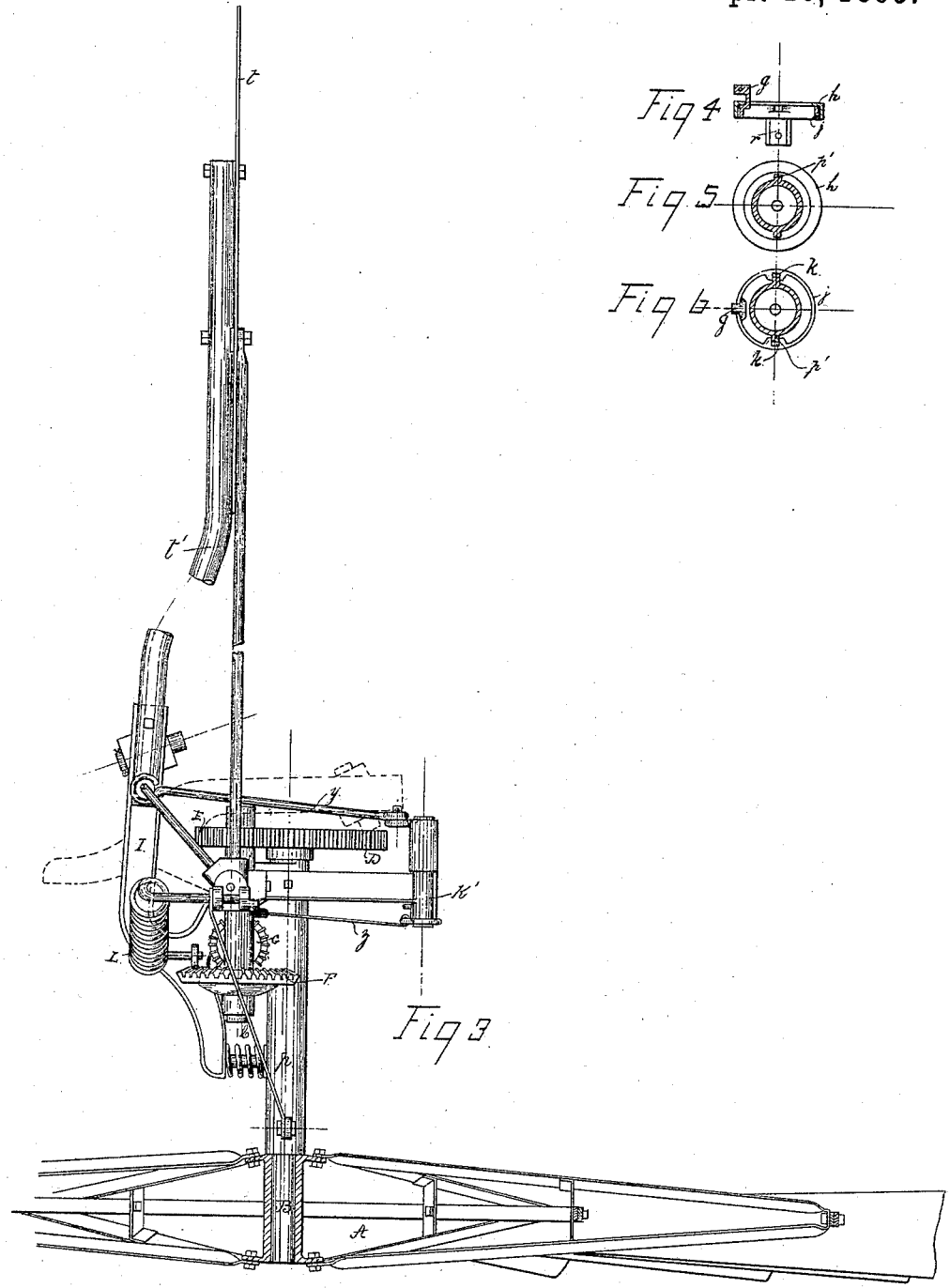

THOMAS O. PERRY, OF CHICAGO, ILLINOIS.

WINDMILL.

SPECIFICATION forming part of Letters Patent No. 495,510, dated April 18, 1893.

Application filed March 24, 1890. Serial No. 345,148. (No model.)

*To all whom it may concern:*

Be it known that I, THOMAS O. PERRY, a citizen of the United States, residing at Chicago, in the county of Cook and State of Illinois, have invented a new and useful Windmill, of which the following is a specification.

My invention relates more especially to improvements in wind-mills which have to impart rotary motion to machinery of any kind by means of gearing and a vertical revolving shaft; and the objects of my improvement are, first, to provide against the tendency of the wind wheel to turn out of the wind, due to the torsional strain of the vertical shaft reacting against the turntable; and also to provide other improved devices as hereinafter to be specified. I attain these objects by the mechanism illustrated in the accompanying drawings, in which—

Figure 1, is a side view of the wind-mill, omitting the vane and regulating spring. Fig. 2, is a front view of the wind-mill, omitting the wind wheel and vane. Fig. 3, is a plan of the wind-mill. Fig. 4, is a vertical section of the outer and inner furl rings cut by a plane containing the vertical axis of the turntable and parallel with the main shaft which carries the wind wheel. Fig. 5, is a plan of the outer furl ring, inclosing a section of the vertical body of the turn-table and vertical shaft. Fig. 6, is a plan of the inner furl ring inclosing a section of the vertical body of the turn-table and vertical shaft.

Similar letters refer to similar parts throughout the several views.

The wind wheel, A, is secured to the forward end of the main shaft, B, whose bearings are in the turntable, p, which in turn is supported by and turns around the fixed pivot tube, W, about a vertical axis, as required for allowing the wind wheel to face the wind from any direction. The pivot tube, W, is bolted to the top of a mast, X, which represents the top of a tower designed to support the wind mill high above the ground. The tail, t, is hinged to the turn-table, p, so as to be allowed a horizontal angular movement therewith of about ninety degrees, but is retained in a position at right angles to the wind wheel, A, by means of a spring, L, connected at its lower end with the tail hinge, I, and fastened at its upper end to the post, K, secured to the turn-table, p. By overcoming the tension of the spring, L, the wind wheel, A, may be made to assume a position parallel with the tail, t, in which position the wind wheel will be at rest, as the wind blowing parallel with the tail will not strike the face of the wheel. These general features so far described are not new in wind-mills, and need not be described more minutely.

The main shaft, B, passes to one side of the vertical axis of the turntable, p, and has keyed thereto at its rear end, behind the vertical axis of the turn-table, a spur gear wheel D, which drives a spur pinion, E, keyed to the rear end of a short horizontal shaft C, whose bearings are in the top of the turn-table, and whose axis intersects the vertical axis of the turn-table above the main shaft B. A bevel gear wheel F, is keyed to the forward end of the short shaft C, and in turn drives a bevel gear pinion G, keyed above the main shaft B to a vertical shaft H, whose axis coincides with that of the turn-table, and whose upper bearing is in the turn-table. A bearing m, attached to the bottom of the pivot tube W, and other bearings, m', l, fastened to the mast X, at suitable intervals, also serve to support the vertical shafting H, P, Q, which is thus made to transmit the power of the wind wheel to driven machinery below.

The mechanism for turning the wind wheel out of wind and bringing it to a state of rest is as follows: A crooked furl lever K', is pivoted to an arm of the post K, secured to the turn-table p. A link y, connects one end of the lever, K', with the tail bone t', back of the tail hinge. A link z, connects the other end of lever K' with the interior edge of the inner furl ring j, which loosely surrounds the vertical body of the turn-table p, and is provided with internal notches k, which fit loosely upon the vertical ribs p' on the turn-table, so that while the ring j, can slide vertically on the ribs p', it must turn with the turn-table about its vertical axis. The furl ring, j, could otherwise be made to turn with the turn table by the torsional stiffness of the link, Z, independently of the ribs, p'. An outer furl ring, h, sets loosely over and surrounds the outer rim of the inner furl ring j, and has two ribbed ears, r, on the outside extending below the inner furl ring. Against the inside of these ears, r, are bolted or riveted the ends of a flat U shaped bar, N, so that the ends of this flat bar hold the inner ring j, from dropping out of the outer ring h. The straight portions of the flat bar, N, pass loosely through guides, n, n' on either side of the pivot tube W, while the bent portion, O, of the flat bar N, reaches below the guides, n', and is thrown forward to clear the vertical shaft, so that it may be grasped by the hand, or otherwise, at the center of the band; though ordinarily a stout wire, O' is fastened into the bend O, and extends down to the ground where it may be pulled to turn the wind wheel out of wind. The outer furl ring h, when pulled down by means of the bar N, has a vertical movement only, but the inner furl ring j, besides its vertical movement, turns within the outer ring h; for, as the tail is held by the wind, the turn-table p turns on the pivot tube W when the furling takes place.

Instead of a furl bar N, bent double as shown, a simple straight bar could be used attached only to one side of the outer furl ring h, but in this form would need to be much stiffer than the bent bar. The torsional strain on the vertical shafting, H, P, Q, reacts against the turn-table, p, which is free to turn on the pivot tube, W, except as it is held in any particular position by the action of the wind against the tail, t; and this torsional strain is detrimental in its effects, as it acts to turn the wind wheel out of wind as against the efforts of the tail, t, to hold the wind wheel square to the wind. This evil tendency of the torsional strain in the vertical shafting is diminished in proportion as the speed of the vertical shafting is increased with reference to the speed of revolution of the wind wheel.

The use of two sets of gear wheels and pinions (as shown in the drawings) all connected with shafts having bearings in the turn-table, p, facilitates making a greater ratio of speed between the vertical shafting and wind wheel than could conveniently be obtained with but one gear wheel and one pinion carried by the turn-table, as is done in other wind-mills. Compactness, lightness, and greater strength, with the same amount of metal are thus gained, besides the advantage of being able to do with light vertical shafting running at high speed with low torsion, the same amount of work that is ordinarily done with a heavy vertical shafting running slowly with high torsional strain.

The safety coupling is peculiarly useful in connection with the vertical shaft of a windmill and serves, in the utilization of wind power, a special purpose not required of it in connection with any other form of motor, for the reason that no other motor is liable to be subjected to such extreme variations of strain from the source of its power. A practical wind motor is required to utilize effectively winds of moderate velocity, and to this end must not be made excessively cumbersome and heavy, and special devices are required to insure safety in unusually high winds, so that more work can not be exacted of the windmill than its strength, limited by the requirements of general utility, will safely allow. Horse powers can be made strong enough to withstand the greatest strain that the horses can impart; water motors are not liable to be broken by excessive increase of head of water; safety valves and governors protect steam engines against an excessive pressure of steam, but wind wheels are required to work at times under pressure of wind that is liable to increase almost without limit, and the power of which varies as the cube of its velocity. Therefore, the safety coupling, while it may be dispensed with in other motors without sacrifice of effective work, becomes essential to the safety of a windmill built with a view to gaining the best results in the most serviceable winds.

Although by increasing the speed of the vertical shaft, its torsional reaction tending to displace the wind wheel with reference to the direction of wind, may be correspondingly reduced, yet practically the speed of revolution is necessarily limited, and a certain amount of detrimental torsional reaction cannot be eliminated by simply increasing the speed of revolution. What remains, however, of torsional reaction after being reduced to the lowest practical limit, may in practice be completely counterbalanced by the pressure of wind against the face of the wind wheel, as this wind pressure is exerted on one side of the vertical axis of the turntable in line with the axis of the main shaft, B, and the wind wheel revolves about this axis in the direction required to make the wind pressure and torsional reaction of the vertical shaft counteract each other. By letting the main shaft pass by the vertical shaft on one side, I gain needed length of shaft and distance between journal bearings; and by placing the pinion on the vertical shaft above the main shaft, I also am enabled to place the second shaft and its intermediate gearing above, where they will not interfere with carrying the tubular support up to or even above the main shaft carrying the wind wheel, which is thus supported in the most direct and secure manner without awkward upwardly extending arms.

What I claim, and desire to secure by Letters Patent, is—

1. In a wind-mill, the supporting frame or turntable, pivoted on a fixed tubular support so as to turn freely thereon about a vertical axis, the cylindrical body of said turntable extending vertically downward and inclosing said tubular support, in combination with two vertically movable concentric furl rings swiveled together and both surrounding the cylindrical body of said turntable, the furl link connecting the furling mechanism above, on the turntable, with one of said furl rings, and the vertically sliding bar rigidly connected with the other of said furl rings, said bar being guided vertically on said fixed support, substantially as herein set forth.

2. In a wind-mill, the supporting frame or turntable pivoted on a fixed tubular support so as to turn freely thereon about a vertical axis, the cylindrical body of said turntable extending vertically downward and enclosing said tubular support, in combination with two vertically movable concentric furl rings, swiveled together and both surrounding said cylindrical body, one of said furl rings being connected from above with the furling mechanism of the wind-mill and guided to rotate with said turntable while sliding vertically on its cylindrical body, and the U shaped furl bar guided vertically on the fixed support and rigidly connected with the other of said furl rings on opposite sides thereof, substantially as herein set forth.

THOMAS O. PERRY.

Witnesses:
LA VERNE W. NOYES,
DELONSON E. BARNARD.